United States Patent Office 3,355,482
Patented Nov. 28, 1967

3,355,482
STABILIZED CYANOACRYLATE ADHESIVES
Harry W. Coover, Jr., and Thomas H. Wicker, Jr., Kingsport, Tenn., assignors to Eastman Kodak Company, Rochester, N.Y., a corporation of New Jersey
No Drawing. Filed June 20, 1966, Ser. No. 558,608
9 Claims. (Cl. 260—464)

This application is a continuation-in-part of copending application Serial No. 234,528 filed October 31, 1962 now abandoned.

This invention relates to adhesive composition and is particularly concerned with adhesive composition comprising an ester of α-cyanoacrylic acid having improved stability and processes for preparing the same.

It is desirable to have adhesive compositions which can be used for bonding all kinds of articles such as glass, metals, plastics, rubber, wood, cement, paper, cloth, and the like to themselves or to each other with a high-strength adhesive bond. Such adhesive compositions are the α-cyanoacrylic acid esters as described by Harry W. Coover, Jr., and Newton H. Shearer, Jr., Patent No. 2,794,788. The adhesive compositions disclosed in this patent are monomeric esters of α-cyanoacrylic acid, wherein the ester group is either an alkyl group of from 1 to 16 carbon atoms, a cyclohexyl group, or a phenyl group. These monomeric esters can be spread in a thin film on the surface of the articles to be bonded together and polymerized rapidly at room temperature, and without the use of a catalyst, to give adhesive bonds of great strength. Because of the inherent tendency of these monomeric esters to polymerize, the shelf stability of the adhesive compositions has been a problem. Heretofore, the monomer compositions have been stabilized by the inclusion therein of a gaseous inhibitor which is preferably sulfur dioxide, but which can be hydrogen fluoride or nitric oxide. Such inhibitors do not interfere with the formation of the adhesive bond and provide a degree of stability, particularly when the adhesive composition is kept in a cool place. The prior art gaseous stabilizers such as sulfur dioxide have been incorporated into the cyanoacrylate composition after the cyanoacrylate has been manufactured and is undergoing distillation or redistillation. The inherent undesirable toxic properties of gases such as nitric oxide and sulfur dioxide place burdensome limitations on the type of equipment used in the distillation procedures. Precautionary measures must be taken to avoid leakage of any toxic gas during the distillation procedures. Also, the use of a toxic gaseous compound in an adhesive is objectionable in some commercial applications of the adhesive.

It is accordingly an object of the invention to provide cyanoacrylate adhesive composition containing improved stabilizer materials incorporated therein. Another object is to provide a stabilized cyanoacrylate composition which does not contain objectionable materials such as sulfur dioxide and nitric oxide. Another object is to provide a new process for the preparation of a stabilized cyanoacrylate adhesive. Another object is to provide a new method for the preparation of a novel cyanoacrylate adhesive through the use of a stabilizer incorporated into the composition during the manufacture of said composition. A further object is to provide a stabilizer for cyanoacrylate adhesive compositions which may be incorporated therein without the inherent process difficulties of incorporating a gaseous inhibitor into the composition. Other objects will be apparent from the description and claims which follow.

These and other objects are attained by means of this invention, which comprises adhesive compositions containing a monomeric ester of α-cyanoacrylic acid having the formula:

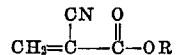

wherein R is a member of the group consisting of alkyl groups of 1 to 16 carbon atoms, cyclohexyl groups, and phenyl groups, and containing as a stabilizer an organic sulfur containing compound. The compositions embodying this invention can be stored at room temperatures or at temperatures well above room temperature in closed containers without polymerization over long periods of time.

The monomeric α-cyanoacrylic acid esters which are employed in practicing the invention can be prepared by reacting esters of cyanoacrylic acid with formaldehyde in non-aqueous media in the presence of a basic condensation catalyst, as described in U.S. Patent 2,721,858 of October 25, 1955 or as described in U.S. patent application Serial No. 74,748 of our co-workers Hawkins and McCurry, now U.S. Patent 3,254,111. The α-cyanoacrylic acid esters can also be obtained as described in U.S. Patent 2,467,926 of April 19, 1949, by reacting an alkyl, cyclohexyl, or phenyl cyanoacetate first with an alkali metal alcoholate, and then with a compound of the formula $ROCH_2X$, in which X is a halogen atom and R is an alkyl, cyclohexyl, or phenyl group. The product obtained by these and similar reactions is a polymer of α-cyanoacrylate, which is then depolymerized by heating the polymer in the presence of phosphorous pentoxide or similar acidic inhibitor. The monomeric ester which thus formed was previously stabilized by introducing a gaseous inhibitor such as nitric oxide or sulfur dioxide into the monomeric vapors before condensation.

It has now been found that organic sulfur containing materials which either have boiling points from about 5° C. at 760 mm. to about 300° C. at 1 mm. or which decompose within this range to produce derivative organic compounds are effective stabilizers for the cyanoacrylate monomer. The above compounds are effective as stabilizers only if they are incorporated into the composition during the preparation of the cyanoacrylate before pyrolysis to obtain the monomer. The exact role of the respective compound has not been characterized in terms of molecular structure, but it has been appreciated that this stabilizer must be introduced into cyanoacrylate composition before pyrolysis. The stabilizing effect of these organic sulfur containing compounds is quite unexpected since the respective compounds are not stabilizers when they are merely blended into the cyanoacrylate monomer. Thus, the respective compound is apparently converted into another form during the initial preparation of the cyanoacrylate composition.

In the broader aspects of this invention the organic sulfur containing compound having the above properties is added to the cyanoacrylate composition at some intermediate point during the initial polymerization of the cyanoacrylate. The preferred compounds which are added include the alkyl sulfates, mercaptans, alkyl sulfides, alkyl sulfones, alkyl sulfoxides, alkyl sulfites, and 3-sulfolene. These chemical compounds apparently react with or deactivate the cyanoacrylate prior to the condensation of the cyanoacrylate monomer. X-ray fluorescence analysis of the material indicates the presence of sulfur in a small but measurable amount, approximately 0.0005%– 0.003% based on the weight of the final monomeric cyanoacrylate product. However, the most sensitive analytical techniques indicate that there is no sulfur present in the form of sulfur dioxide.

In further detail with respect to the incorporation of the stabilizer in the reaction process, in a reaction of the type where water is generated in the reaction and removed azeotropically or otherwise a convenient time and place of adding our organic sulfur compound would be about contemporaneous with said water removal or immediately thereafter. In any event, the chemical is suitably incorporated before the completion of the reaction and then the reaction continued to completion. At the completion there results a stabilized product of the present invention characterized in that a small but measurable amount of sulfur may be detected in said stabilized product. This sulfur is in a form distinct and apart from sulfur dioxide. As explained above, the organic sulfur containing compounds added during the reaction are converted or otherwise are caused to provide the aforementioned built-in stabilizer. The detection of sulfur as discussed above is a means of ascertaining that the finished adhesive composition is adequately stabilized.

A further understanding of our invention may be had from a consideration of the following examples which are set forth to illustrate certain preferred embodiments of the invention:

*Example I (a)*

To a refluxing mixture of methyl cyanoacetate (1 m., 99 g.), 25 ml. of benzene, 0.1 g. of piperidine and 20 drops of a 10% sodium-hydroxide solution was added 24 g. of paraformaldehyde at such a rate that reflux was not disturbed. Water was removed as formed by means of a water separator. After water removal was complete, the following materials were added to the reaction vessel prior to removal of benzene: 3-sulfolene, 1 g., hydroquinone, 2 g., phosphorus pentoxide, 2.1 g. 3-sulfolene has a melting point of 65° C. and decomposes at temperatures in excess of 65° C. The benzene was then distilled off with stirring and the mixture was placed under vacuum to distill the product. The majority of the product was collected before the pot reached a temperature of 175° C. at 5 mm. The product was stable and contained 0.001% sulfur by X-ray fluorescence analysis.

*Example I(b)*

Example I(a) was repeated with the exception that 3-sulfolene was not added to the mixture. During the pyrolysis step after the removal of the benzene, the product polymerized in the receiver.

*Example II*

Example I(a) was repeated with the exception that 1.0 g. dimethyl sulfoxide was used instead of 3-sulfolene. Dimethyl sulfoxide has a boiling point of 88–89° C. at 15 mm. and decomposes at 100° C. The monomeric product was stable on storage at room temperature.

*Example III*

The procedure of Example I(a) was repeated with the exception that 0.5 g. diethyl sulfate was used instead of 3-sulfolene. Diethyl sulfate has a boiling point of 96° C. at 15 mm., 118° C. at 40 mm. and 208° C. at 760 mm. The monomeric product contained 0.001% sulfur as determined by X-ray fluorescence.

*Example IV*

The procedure of Example I(a) was repeated with the exception that 0.5 g. diethyl sulfone was used instead of 3-sulfolene. Diethyl sulfone has a boiling point of 248° C. at 760 mm. The monomeric product was stable and contained 0.0015% sulfur.

*Example V*

A mixture of 99 g. of methyl cyanoacetate, 30 g. of paraformaldehyde, 0.3 ml. of piperidine, and 100 ml. of propanol-2 was heated to reflux with efficient stirring. The mixture was refluxed 2 hr. and 90 ml. of the propanol-2 was removed by distillation. Then 100 ml. of benzene was added and the remaining water was removed by azeotropic entrainment with benzene. The practically anhydrous residue was then treated with 4.5 g. of phosphorus pentoxide, 3 g. of hydroquinone and 1 g. of 3-sulfolene. The remainder of the benzene was distilled off and the residue was depolymerized by heating to a pot temperature of about 175° at 1–2 mm. The monomer so produced was stable at room temperature and contained 0.002% sulfur as shown by analysis.

*Example VI*

Preparation of methyl 3-methoxy-2-cyanopropionate and pyrolysis to methyl alpha-cyanoacrylate.

Metallic sodium (23 g.) was added to 500 ml. absolute methyl alcohol in a one-liter, three-necked flask under a dry nitrogen blanket. Then, 99 g. of methyl cyanoacetate was added to the mixture in a dropwise manner. This mixture was maintained below 35° C. and 88.5 parts of chloromethyl methyl ether was gradually added. The mixture was refluxed until neutral to moist litmus, and the methanol and unreacted material was then removed from the mixture under a good vacuum. The product was extracted from the residue with diethyl ether, the ethereal solution was dried over anhydrous magnesium sulfate and the ether was distilled after the magnesium sulfate had been filtered off. To the residue was then added 1.5 g. phosphoric anhydride, 0.2 g. hydroquinone and 0.75 g. of diethyl sulfate. Diethyl sulfate has a boiling point of 208° C. at 760 mm. The reaction mixture was heated to a maximum pot temperature of 175–200° C. to convert the methoxy derivative to the alpha-cyanoacrylate. When no more methanol could be distilled, vacuum was applied to the system and the monomer was distilled at 43–49° under 1.5 mm. The product was stable and contained 0.0009% sulfur.

*Example VII*

Example I(a) was repeated with the exception that n-butyl cyanoacetate was used instead of methyl cyanoacetate. The monomer had a boiling point of 92–94° C./ 8.5–9.2 mm. and contained 0.0011% sulfur.

*Example VIII*

Example I(a) was repeated with the exception that capryl cyanoacetate was used instead of methyl cyanoacetate. The stable monomer had a boiling point of 107–112° C. at 4.5–5.2 mm. and contained 0.0014% sulfur.

*Example IX*

Example I(a) was repeated with the exception that ethyl cyanoacetate was used instead of methyl cyanoacetate and 1.0 g. dibutyl sulfide was used instead of 3-sulfolene. Dibutyl sulfide has a boiling point of 190–230° C. at 760 mm. The resulting stable monomer contained 0.002% sulfur.

*Example X*

Example I(a) was repeated with the exception that 0.5 g. diethyl sulfite was used in place of 3-sulfolene. Diethyl sulfite has a boiling point of 51° C. at 13 mm., 69° C. at 30 mm. and 158° C. at 760 mm. The stable product contained 0.001% sulfur.

Other compounds such as dibutyl sulfite-bp 109–115° C. at 15 mm., dioctyl sulfite-bp 133–134° C. at 1 mm., and dibutyl sulfate-bp 110–114° C. at 4 mm. also exhibited excellent stabilization of cyanoacrylate adhesives when used according to this invention. All of the above sulfur containing compounds are quite distinct from sulfur dioxide in that sulfur dioxide can be merely added to the monomer to prevent premature polymerization whereas the above compounds must be added prior to condensation of the monomer. Also, sulfur dioxide has a boiling point of −10° C. which is much lower than the organic sulfur containing compounds of this invention.

The improved stabilization effect is apparently not due to the decomposition of these sulfur containing compounds. As exemplified above, the same stabilization effect is observed when using organic sulfur compounds which do not normally decompose within the defined boiling point range.

In the above examples, in place of the benzene other hydrocarbon liquids or the like such as toluene, heptane, or the xylenes may be used for azeotroping purposes. In place of the hydroquinone and phosphorus pentoxide other reagents exemplified by polyphosphoric acid, antimony pentoxide, picric acid, hydroquinone monomethyl ether, 5-butyl catechol, metaphosphoric acid, maleic anhydride, ferric chloride and the like may be used. Likewise, other changes such as the use of aqueous formaldehyde may be made in certain of the above illustrative examples.

The organic sulfur compounds of this invention are at least as good as sulfur dioxide stabilizers, and the hydroquinone stabilizer is not necessary in the cyanoacrylate to prevent premature polymerization. Comparable results in stabilization are observed when the organic sulfur compounds are the sole stabilizer in the cyanoacrylate monomer as opposed to the mixture of sulfur dioxide plus hydroquinone as used in the prior art. The following example demonstrates the effective stabilization without hydroquinone compounds.

*Example XI*

To a 500 ml., 3-necked flask fitted with Dean-Stark tube and cold water condenser, powder addition funnel, and a magnetic stirrer was added 99 g. (1 mole) of methyl cyanoacetate, 25 ml. of benzene, 0.1 g. of piperidine and 20 drops of a 10% aqueous sodium hydroxide solution. This stirred mixture was heated to reflux and 24 g. (0.8 mole) of paraformaldehyde was added through the powder funnel in about five equal portions. Water was removed as formed by the Dean-Stark tube. After water removal was complete 1.0 g. of 3-sulfolene and 2.1 g. of phosphorus pentoxide was added to the reaction flask. The benzene was then distilled off and the product was distilled under vacuum to a pot temperature of 179° C. at 3.2 mm. through a distillation column and head which had been acetic acid washed. A yield of 42 g. of clear, water-white monomer was obtained. No evidence of polymerization was observed.

The cyanoacrylate composition produced as above described may be used for any of the purposes disclosed in companion Patent 2,794,788. The stability and the like properties of the cyanoacrylate compositions produced by the procedures set forth herein are at least equal to and in some instances better than the comparable properties of the compositions set forth in said patent.

Although this invention has been described in considerable detail with particular reference to certain preferred embodiemnts thereof, variations and modifications can be effected within the spirit and scope of the invention as described hereinabove, and as defined in the appended claims.

We claim:
1. A process for preparing a stable ester of α-cyanoacrylic acid of the formula

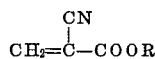

wherein R is a member of the group consisting of alkyl groups having 1–16 carbon atoms, cyclohexyl and phenyl, which comprises reacting an ester of cyanoacetic acid of the formula

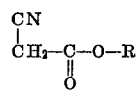

wherein R is as defined above, with formaldehyde in the presence of a basic polymerization catalyst to form a lower polymer of said α-cyanoacrylate, adding to the reaction product an organic sulfur-containing-compound selected from an alkyl sulfate, mercaptan, alkyl sulfide, alkyl sulfone, alkyl sulfoxide, alkyl sulfite or 3-sulfolene, said compound being added in amounts sufficient to generate in situ a stabilizing compound having a boiling point or decomposition temperature from about 5° C. at 760 mm. to about 300° C. at 1 mm., and depolymerizing said lower polymer in the presence of an acidic inhibitor at a temperature of about 175–200° C. and condensing stabilized α-cyanoacrylate monomer, said amounts being sufficient to provide said monomer with 0.0005–0.003 percent by weight sulfur as determined by X-ray fluorescence analysis.

2. A process according to claim 1 wherein said acidic inhibitor is phosphorus pentoxide.

3. A process according to claim 1 wherein said organic sulfur containing compound is added to the reaction mixture before the reaction is substantially completed.

4. A process for preparing a stable ester of α-cyanoacrylic acid of the formula

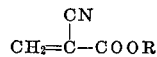

wherein R is a member of the group consisting of alkyl of 1–16 carbon atoms, cyclohexyl and phenyl, which comprises reacting an ester of cyanoacetic of the formula:

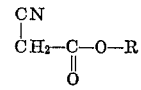

wherein R is as defined above, with an alkali metal alcoholate and then with a compound of the formula

wherein X is a halogen atom and R is as defined above; removing the unreacted material from the reaction product, adding to said reaction product an acidic inhibitor and an organic sulfur-containing compound selected from an alkyl sulfate, mercaptan, alkyl sulfide, alkyl sulfone, alkyl sulfoxide, alkyl sulfite or 3-sufolene, said compound being added in amounts sufficient to generate in situ in stabilizing compound having a boiling point or decomposition temperature from about 5° C. at 760 mm. to about 300° C. at 1 mm., heating the resulting mixture to convert the reaction product to the α-cyanoacrylate and distilling and condensing a stabilized α-cyanoacrylate, said stabilizing amounts being sufficient to provide said α-cyanoacrylate with from 0.0005 to 0.003 percent sulfur as determined by X-ray fluorescence analysis.

5. A process according to claim 4 wherein said acidic inhibitor is phosphoric anhydride.

6. In the process of pyrolysis of a poly(alkyl-2-cyanoacrylate) to a α-cyanoacrylate monomer, the step which comprises adding prior to the pyrolysis operation an organic sulfur-containing compound selected from an alkyl sulfate, mercaptan, alkyl sulfide, alkyl sulfone, alkyl sulfoxide, alkyl sulfite or 3-sulfolene, said compound being added in amounts sufficient to generate in situ a stabilizing compound having a boiling point or decomposition temperature from about 5° C. at 760 mm. to about 300° C. at 1 mm.

7. The stabilized product produced by the process of claim 1.

8. The stabilized product produced by the process of claim 4.

9. The stabilized product produced by the process of claim 6.

References Cited

UNITED STATES PATENTS

| | | | |
|---|---|---|---|
| 2,756,251 | 7/1956 | Joyner et al. | 260—465 |
| 2,763,677 | 9/1956 | Jeremias et al. | 260—465 |
| 2,765,332 | 10/1956 | Coover et al. | 260—464 |
| 2,784,215 | 3/1957 | Joyner | 260—465 |
| 2,794,788 | 6/1957 | Coover et al. | 260—465 X |

JOSEPH P. BRUST, *Primary Examiner.*